April 14, 1953  W. VIETS  2,634,642

ATTACHMENT FOR IMPACT WRENCHES

Filed Dec. 22, 1949

INVENTOR,
WALTER VIETS

BY *Terry & Cohn*
ATTORNEYS

Patented Apr. 14, 1953

2,634,642

UNITED STATES PATENT OFFICE 2,634,642

ATTACHMENT FOR IMPACT WRENCHES

Walter Viets, St. Louis, Mo.

Application December 22, 1949, Serial No. 134,505

1 Claim. (Cl. 81—121)

This invention relates to improvements in attachments for impact wrenches, and more particularly to a two-part device, particularly for use with and on the powered torque rod or like element of those wrenches which are widely used in automotive assembly and similar fields, and which usually embody means to limit the torque applied to a nut or the like, as same is threaded up in assembly.

The prevalent difficulty leading to the present design, particularly in the field of usage above referred to, but without limitation to such field, arises from the relatively short life of socket elements now utilized with power-driven impact wrenches. Such life is many cases is as short as four to six hours of actual usage on a busy assembly line. From this results an inordinately high cost of this type of assembly tools, and it is primarily to the extension of such life and the improvement of wrench operation, that the present invention is primarily objectively directed.

The current invention may be summarized by reference to the embodiment herein disclosed, as comprising major attachment elements consisting of an adapter, to the extent that same may be necessary, which adapter includes a socketed head the socket of which is formed to receive and match a powered torque element or rod of an externally polygonal section. Such a rod is conventionally utilized as one of the final wrench-actuating elements of the assembly. The head of the adapter and the torque rod are provided with interfitting axial retention means, such as a plunger or ball in one of such elements, and a companion ball recess in the other element. Depending below the head of the adapter is a polygonal rod element, for example of hexagonal external formation, for greatest production economy, the last said element consisting of a stem inserted in a recess therefor in the head of the adapter which later may be shrunk or swaged on the stem so that the head and stem thus become virtually a one-piece member.

A second major element of the attachment consists of a novel wrench socket characterized by a bore or passage therethrough which is of the same shape and cross sectional area throughout its length, except insofar as the bore may be modified midway of its ends, as by a groove coacting with a plunger on the stem for axial retention of the socket on the stem. The important objective thus usually attained is the end-for-end reversibility of the socket. It will be seen from the description given that the socket is symmetrically formed, at least as to its bore, at each side of a transverse plane midway of its ends. Thus after a period of usage the socket is easily removed and end-to-end reversed on the stem, thus affording virtually a doubled useful socket life.

Further objectives of the invention include a bevelled or chamfered entrance end of the bore or passage of the socket, with such formation at each end of the socket; the provision of a distinct shoulder as an upper abutment for the socket, on the adapter, as formed at the conjunction of the stem and the head of the adapter, together with other advantageous features and refinements.

The foregoing and numerous other objects will hereinafter more clearly appear from the following detailed description of a preferred embodiment of the invention, particularly when considered in connection with the accompanying drawing, in which.

Figure 1:
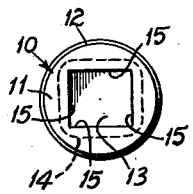
Fig. 1 is a top or end view of an adapter.
Figure 2:
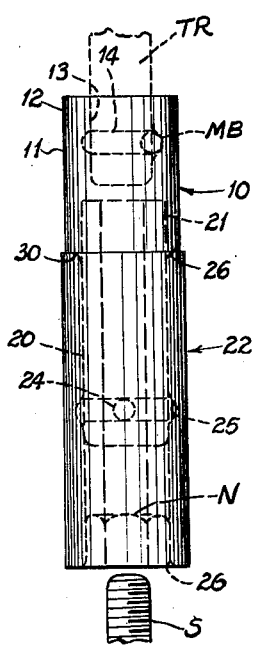
Fig. 2 is a side elevation of the adapter and socket assembly as assembled in a position of use.
Figure 3:
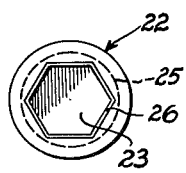
Fig. 3 is an end elevational view of a socket member embodying current improvements.
Figure 4:
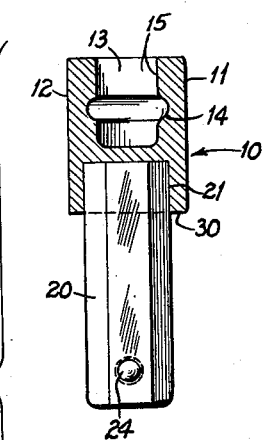
Fig. 4 is an exploded view partly in elevation and partly in longitudinal section, of the adapter and socket as positioned just prior to assembly.
Figure 4:
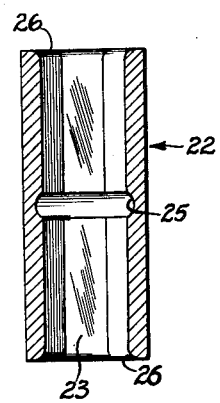

So-called torque wrenches or impact wrenches as used for many manufacturing and assembly purposes, embody a powered, usually rotary, driving rod or shaft indicated at TR, and conventionally provided slightly above the lower end thereof, with a plunger, preferably in the form of a depressible metal ball MB which per se, may be of conventional construction. The powered element such as the torque rod TR, is frequently of a square cross section, and of a hardened steel stock so as to resist wear over a considerable period of time. As thus far described, the structure is or may be of conventional form.

Referring next to the adapter, which is generally indicated at 10, this assembly comprises a head 11, the upper portion of which assumes the form of an open top cup-like formation 12 characterized by a recess or socket 13. An undercut groove 14 is provided for the reception of and coaction with a retaining plunger such as the metal ball MB, so that when the ball extends into the groove 14, the parts are releasably retained against axial displacement.

In many assemblies the torque rod TR is of square section, and so for purposes of present disclosure the recess or socket 13 is of a virtually identical, square cross section, in such case there being four internal longitudinal faces 15 corresponding to similar external faces on the engaging drive member TR. Preferably not much if any more than a working clearance is provided between the torque rod TR and the socket 13, although such clearance is advisable as will enable the easy axial application of the adapter to the torque rod by sliding application thereover.

It will be understood that the recital of a square drive rod TR and squared socket 13 is without limitation to this particular shape, any other usual or suitable polygonal or non-circular section of the parts being suitable, so long as there is assured a positive driving relation between the adapter and rod TR. Accordingly, it should be noted that wherever, in the present disclosure and claims, the term "polygonal" is employed, it is expressly intended to include any regularly geometric angulate section of interfitting parts, including those of square or rectangular section.

The adapter 10 further includes, assuming a vertical position of use, a vertically depending hexagonal stem 20. Although the adapter may be produced of a single piece of metal stock as by automatic screw machine equipment or the like, it is preferred initially to form the head 11 separately, with a socket at its end opposite the recess 13, which socket is indicated at 21, and which will conform substantially in internal shape, to the sectional shape of the stem 20. A firm and permanent attachment of the head and stem may then be effected as by shrinking the lower head portion upon the upper end of the stem, or by swaging or like operation. Irrespective of method of assembly of the head and the stem of the adapter 10, it becomes virtually a rigid article, and constitutes in effect, an integral structure. The stem 20 may be of any suitable polygonal shape, but is shown as of hexagonal cross section, for reasons later herein appearing.

The second major element of the attachment is a novel form of socket generally indicated at 22, and which is given a particular form and design, as making for quick, easy and positive driving effect when applied over a nut such as N irrespective of the endwise reversal of the socket. The socket 22, later described in more detail, is of such length that the continuous bore or passage 23, extending without obstruction fully through the socket, will accommodate the nut N at the currently lower socket end, and at the same time will receive the entire exposed portion of the stem 20, the axial length of which is, as preferred, at least three times the axial length or depth of the nut. Such a relation between the lengths of stem and socket, hence the unusual area of driving engagement between the stem and socket, results in a material reduction of prevailing unit pressures and impact effects, between the stem and the socket. From this relationship it further results that only a minimal or negligible wear and impact effect will be experienced in that portion of the socket which is directly engaged by the stem. It is noted that the stem 20 and the socket are fitted to as close tolerances or clearances as possible, while yet preserving the requisite ease of applicability of the socket over the stem.

Axial retention of the socket on the stem 20 is provided for in the example currently disclosed, by a yieldable plunger shown as a ball 24 depressibly carried by the stem 20 at a position appreciably above the lower end of the stem, and in such position that the ball or a similar plunger element will be located as close to the midpoint of the passage or bore 23, as is possible. In the latter location there is provided either a continuous groove for reception of the ball 24, or a series of spaced recesses such as 25, into which the ball normally extends.

With reference now to the details of structure of the socket 22, the latter is formed with bevelled, rounded or otherwise chamfered entrance throats as indicated at 26, in each end region of the bore or passage 23. These will, now obviously, serve to facilitate application of the socket over the nut or the like N.

The depth or thickness of the material of the socket constituting its wall or walls, while a matter of choice, is preferred to be at least of the order of one-eighth inch in the more prevalent socket sizes, so as to provide a sufficient body of metal consistent with the longer life and period of usage of the socket. While many suitable polygonal sections of the stem 20, and hence of the conforming bore 23, will result in an operative structure, it is preferred that each of these be of hexagonal formation and may be so regarded for purposes of present exemplary description. The six even width faces are thus extended from end to end of the socket 22, and are of even width and area continuously through the passage 23 with the minor exception of the central or intermediate interruptions thereof by the one or more sockets 25 for the retainer plunger, such as ball 24. Thus it appears that, continuously from end to end, the socket is characterized by a cross-sectional area in any zone, which is at least equal to the substantially uniform sectional area of the bore, in the two end regions. Otherwise stated, the entire bore or passage 23 is characterized by a complete absence of any internal projections or obstructions whatever. This feature makes possible the described extension of the stem to a considerable depth below the midpoint of the socket, with advantages above noted.

The manner of usage of the attachment so as best to realize upon the materially augmented useful life of the socket elements, is thought to have been apparent from the foregoing description of parts, but it may be noted for completeness that, assuming the major elements 10 and 22 to be separated, the adapter 10 is virtually instantly applied to bring the socket 13 over the end of the powered driving element such as TR, of the impact or torque wrench assembly. The ball MB will be momentarily depressed, and when the members 10 and TR are brought fully together, will interfit the ball groove 14, thus retaining the adapter and the torque rod in an operative axial relation. The socket 22 may then be applied over the stem 20 merely by endwise insertion of the socket over the stem, resulting in a releasable retention of the parts in proper axial relation, and with the currently upper end of the socket in snug engagement with the shoulder 30, and with the plunger such as ball 24, extending into one of the plunger grooves 25.

Application of the now open end of the socket 22 over the nut end to be threaded up, as on a fixed stud S, will upon application of the requisite driving torque to rod TR, thread up the nut to the desired extent, as controlled by the torque limiting means of the power wrench assembly.

After a period of wear, it will now appear as possible in case of abrasive or spalling effects on the currently used end of socket 22, merely to withdraw the socket, reverse it endwise and reapply same over the stem 20.

The socket may be produced by any conventional or suitable manufacturing process, but it is preferred for uniformity and accuracy of the passage 23, to form the sockets by broaching operations.

In the foregoing description occasional reference has been made to the upper or lower ends of the adapter and socket. Such descriptive terms are used only for brevity, as contemplating a vertical position of the torque rod TR, but are to be understood as without limitation as to any specific position of usage of the assembly or elements.

It will now have appeared that the attachment and parts thereof may be severally or collectively of considerable advantage in use with equipment other than power driven wrench assemblies, and accordingly the field of application should not be regarded as restricted to any single field. It will now have appeared that the device as described will fully realize the several objectives above expressly stated, and others which will be implied from the disclosure. Although the selected embodiment has been referred to in considerable detail, such detail should be understood as instructive, rather than in any limiting sense, many variants being possible within the intended scope of the claim hereunto appended.

I claim as my invention:

An attachment for a powered torque wrench assembly including a torque rod of a defined polygonal cross section, the attachment including an adapter provided with a head formation, the head formation formed with an open-top polygonal recess for receiving the end of the torque rod, such recess conforming closely to the torque rod, means for retaining the adapter in axial position on the torque rod, the head formation further including a polygonal stem-receiving socket formed in the end portion thereof opposite the recess and separated therefrom by an integral intervening wall, a compatible solid stem of polygonal cross section extending into the stem socket and angularly and axially affixed permanently to the head by swaging the wall of the formed stem socket upon the depending stem, the axial length of the exposed portion of the stem being of the order of at least three times the axial length or depth of the nut, and a nut-engaging socket provided with an end-to-end passage characterized by a polygonal wall formation and conforming closely to the polygonal formation of said stem, with not substantially more than a working clearance therewith, the head providing a distinct shouldered abutment for the socket which serves to limit the penetration of the socket by the stem, the socket passage being of uniform polygonal transverse section in both end regions of the socket from substantially a midpoint thereof, and characterized by a cross sectional area throughout its length which area is at least equal, in any transverse plane, to the sectional area of the passage or bore in the end regions of the socket, the socket being of such length that the continuous passage will accommodate the nut at the currently lower socket end, and at the same time will receive the entire exposed portion of the stem, with a substantial clearance between the nut and the stem, the area of engagement of stem and socket so materially exceeding the area of engagement of nut and socket, that socket destructive effects incident to impact are substantially localized in the nut-engaging region of the socket, the socket being provided with a recess midway of its ends, and adapted to receive a socket-retaining element, said stem being provided substantially inwardly of one of its ends, with a projecting retainer member adapted to engage the said recess in the bore of the socket, so relating the stem to the socket that the stem occupies the major part of the length of the bore.

WALTER VIETS.

References Cited in the file of this patent

UNITED STATES PATENTS

| Number | Name | Date |
|---|---|---|
| 810,559 | Ansorge | Jan. 23, 1906 |
| 1,416,461 | Hance | May 16, 1922 |
| 1,420,279 | Parsons et al. | June 20, 1922 |
| 1,573,464 | Topping | Feb. 16, 1926 |
| 1,578,065 | Bemus et al. | Mar. 23, 1926 |
| 1,660,989 | Carpenter | Feb. 28, 1928 |
| 1,854,116 | De Schebeko | Apr. 12, 1932 |
| 2,008,367 | Rhinevault | July 16, 1935 |